US007522936B2

(12) United States Patent
Boyle et al.

(10) Patent No.: US 7,522,936 B2
(45) Date of Patent: Apr. 21, 2009

(54) WIRELESS TERMINAL

(75) Inventors: Kevin R. Boyle, Horsham (GB); Peter J. Massey, Horley (GB)

(73) Assignee: NXP B.V., Eindhoven (NL)

(*) Notice: Subject to any disclaimer, the term of this patent is extended or adjusted under 35 U.S.C. 154(b) by 608 days.

(21) Appl. No.: 10/056,096

(22) Filed: Jan. 24, 2002

(65) Prior Publication Data

US 2002/0146988 A1 Oct. 10, 2002

(30) Foreign Application Priority Data

Feb. 13, 2001 (GB) ................................ 0103456.0

(51) Int. Cl.
*H04M 1/00* (2006.01)
*H01Q 1/48* (2006.01)

(52) U.S. Cl. ............................... 455/550.1; 343/700 R; 343/846; 343/848

(58) Field of Classification Search ................ 455/90.3, 455/575.7, 575.1, 550, 575; 343/700 R, 343/729, 767, 746, 702, 700 MS, 846, 848
See application file for complete search history.

(56) References Cited

U.S. PATENT DOCUMENTS 4,587,524 A 5/1986 Hall ........................... 343/729
4,980,694 A * 12/1990 Hines ......................... 343/702
5,764,190 A * 6/1998 Murch et al. ................ 343/702
6,002,367 A 12/1999 Engblom et al. ...... 343/700 MS
6,054,953 A * 4/2000 Lindmark ............ 343/700 MS
6,424,300 B1 * 7/2002 Sanford et al. .............. 343/702

FOREIGN PATENT DOCUMENTS

WO WO0139321 5/2001

OTHER PUBLICATIONS

U.S. Appl. No. 09/912,470, filed Jul. 25, 2001, Inventors: Kevin R. Boyle et al. Entitled: "Wireless Terminal".

* cited by examiner

*Primary Examiner*—Yuwen Pan
(74) *Attorney, Agent, or Firm*—Aaron Waxler

(57) ABSTRACT

A wireless terminal a transceiver coupled to an antenna feed and a ground conductor (502), the antenna feed being coupled directly to the ground conductor (502). In one embodiment the ground conductor is a conducting case (902). The coupling is via a parallel plate capacitor formed by a respective plate (506) and a portion of the surface of the case (502). The case (502) acts as an efficient, wideband radiator, eliminating the need for separate antennas. Slots (912, 1214) perform a matching function, eliminating the need for matching between the transceiver and antenna feed.

20 Claims, 8 Drawing Sheets

WIRELESS TERMINAL

The present invention relates to a wireless terminal, for example a mobile phone handset.

Wireless terminals, such as mobile phone handsets, typically incorporate either an external antenna, such as a normal mode helix or meander line antenna, or an internal antenna, such as a Planar Inverted-F Antenna (PIFA) or similar.

Such antennas are small (relative to a wavelength) and therefore, owing to the fundamental limits of small antennas, narrowband. However, cellular radio communication systems typically have a fractional bandwidth of 10% or more. To achieve such a bandwidth from a PIFA for example requires a considerable volume, there being a direct relationship between the bandwidth of a patch antenna and its volume, but such a volume is not readily available with the current trends towards small handsets. Hence, because of the limits referred to above, it is not feasible to achieve efficient wideband radiation from small antennas in present-day wireless terminals.

A further problem with known antenna arrangements for wireless terminals is that they are generally unbalanced, and therefore couple strongly to the terminal case. As a result a significant amount of radiation emanates from the terminal itself rather than the antenna. A wireless terminal in which an antenna feed is directly coupled to the terminal case, thereby taking advantage of this situation, is disclosed in our co-pending unpublished International patent application PCT/EPO1/08550 (Applicant's reference PHGB010056). When fed via an appropriate matching network the terminal case acts as an efficient, wideband radiator.

An object of the present invention is to provide a compact wireless terminal having efficient radiation properties without the need for a matching network.

According to the present invention there is provided a wireless terminal comprising a ground conductor and a transceiver coupled to an antenna feed, wherein the antenna feed is coupled directly to the ground conductor via a capacitor formed by a conducting plate and a portion of the ground conductor and wherein a slot, partially located underneath the conducting plate, is provided in the ground conductor.

The location of a slot beneath the conducting plate performs much of the function of a conventional matching circuit, thereby simplifying implementation of a wireless terminal. More than one slot may be provided, and a slot may be folded as dictated by space or other requirements.

The present invention is applicable to any wireless communication system where the use of a large antenna is not appropriate. Since the coupling capacitor is small, it is ideally suited to an RF IC or module, where the coupling capacitor would be part of the module. It is particularly useful in wireless systems that feature multiband or wideband operation.

The present invention is based upon the recognition, not present in the prior art, that the impedances of an antenna and a wireless handset are similar to those of an asymmetric dipole, which are separable, and on the further recognition that the antenna impedance can be replaced with a non-radiating coupling element.

Embodiments of the present invention will now be described, by way of example, with reference to the accompanying drawings, wherein.

In the drawings the same reference numerals have been used to indicate corresponding features.

Figure 1:
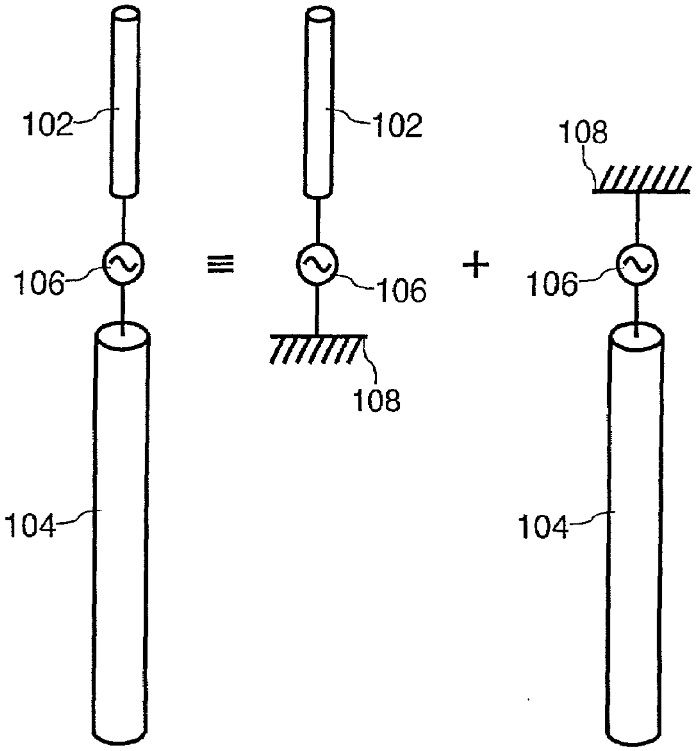
FIG. 1 shows a model of an asymmetrical dipole antenna, representing the combination of an antenna and a wireless terminal.

FIG. 1 shows a model of the impedance seen by a transceiver, in transmit mode, in a wireless handset at its antenna feed point. The impedance is modelled as an asymmetrical dipole, where the first arm 102 represents the impedance of the antenna and the second arm 104 the impedance of the handset, both arms being driven by a source 106. As shown in the figure, the impedance of such an arrangement is substantially equivalent to the sum of the impedance of each arm 102,104 driven separately against a virtual ground 108. The model could equally well be used for reception by replacing the source 106 by an impedance representing that of the transceiver, although this is rather more difficult to simulate.

Figure 2:
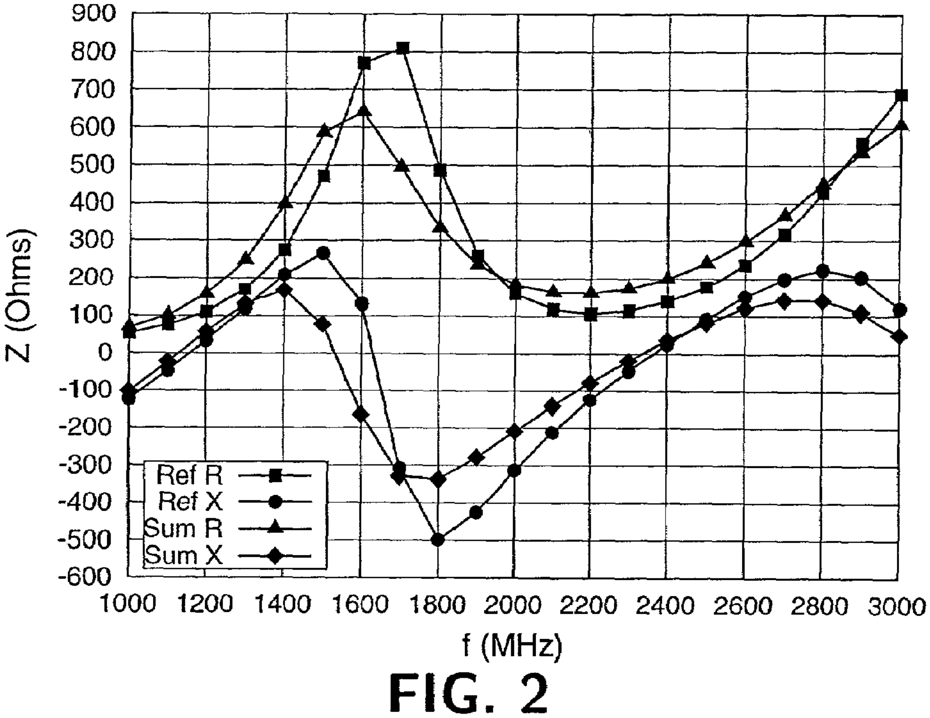
FIG. 2 is a graph demonstrating the separability of the components of the impedance of an asymmetrical dipole.

The validity of this model was checked by simulations using the well-known NEC (Numerical Electromagnetics Code) with the first arm 102 having a length of 40 mm and a diameter of 1 mm and the second arm 104 having a length of 80 mm and a diameter of 1 mm. FIG. 2 shows the results for the real and imaginary parts of the impedance (R+jX) of the combined arrangement (Ref R and Ref X) together with results obtained by simulating the impedances separately and summing the result. It can be seen that the results of the simulations are quite close. The only significant deviation is in the region of half-wave resonance, when the impedance is difficult to simulate accurately.

Figure 3:
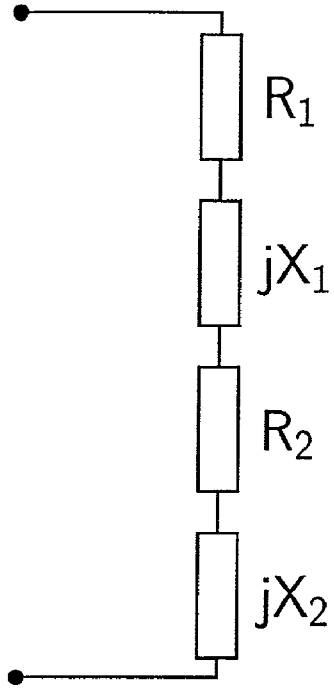
FIG. 3 is an equivalent circuit of the combination of a handset and an antenna.

An equivalent circuit for the combination of an antenna and a handset, as seen from the antenna feed point, is shown in FIG. 3. $R_1$ and $jX_1$ represent the impedance of the antenna, while $R_2$ and $jX_2$ represent the impedance of the handset.

From this equivalent circuit it can be deduced that the ratio of power radiated by the antenna, $P_1$, and the handset, $P_2$, is given by $$\frac{P_1}{P_2} = \frac{R_1}{R_2}$$

If the size of the antenna is reduced, its radiation resistance $R_1$ will also reduce. If the antenna becomes infinitesimally small its radiation resistance $R_1$ will fall to zero and all of the radiation will come from the handset. This situation can be made beneficial if the handset impedance is suitable for the source 106 driving it and if the capacitive reactance of the infinitesimal antenna can be minimised by increasing the capacitive back-coupling to the handset.

Figure 4:
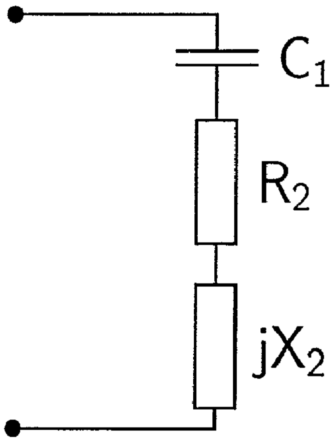
FIG. 4 is an equivalent circuit of a capacitively back-coupled handset.

With these modifications, the equivalent circuit is modified to that shown in FIG. 4. The antenna has therefore been replaced with a physically very small back-coupling capacitor, designed to have a large capacitance for maximum coupling and minimum reactance. The residual reactance of the back-coupling capacitor can be tuned out with a simple matching circuit. By correct design of the handset, the resulting bandwidth can be much greater than with a conventional antenna and handset combination, because the handset acts as a low Q radiating element (simulations show that a typical Q is around 1), whereas conventional antennas typically have a Q of around 50.

Figure 5:
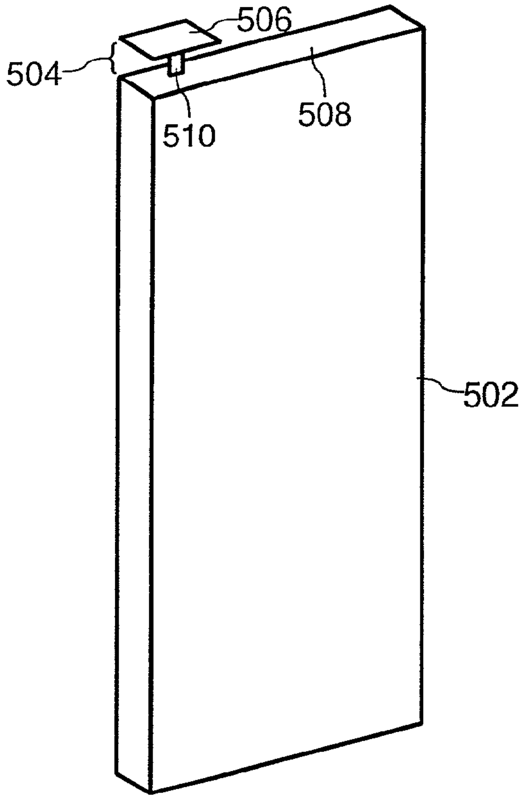
FIG. 5 is a perspective view of a basic capacitively back-coupled handset.

A basic embodiment of a capacitively back-coupled handset is shown in FIG. 5. A handset 502 has dimensions of 10×40×100 mm, typical of modern cellular handsets. A parallel plate capacitor 504, having dimensions 2×10×10 mm, is formed by mounting a 10×10 mm plate 506 2 mm above the top edge 508 of the handset 502, in the position normally occupied by a much larger antenna. The resultant capacitance is about 0.5 pF, representing a compromise between capacitance (which would be increased by reducing the separation of the handset 502 and plate 506) and coupling effectiveness (which depends on the separation of the handset 502 and plate 506). The capacitor is fed via a support 510, which is insulated from the handset case 502.

Figure 6:
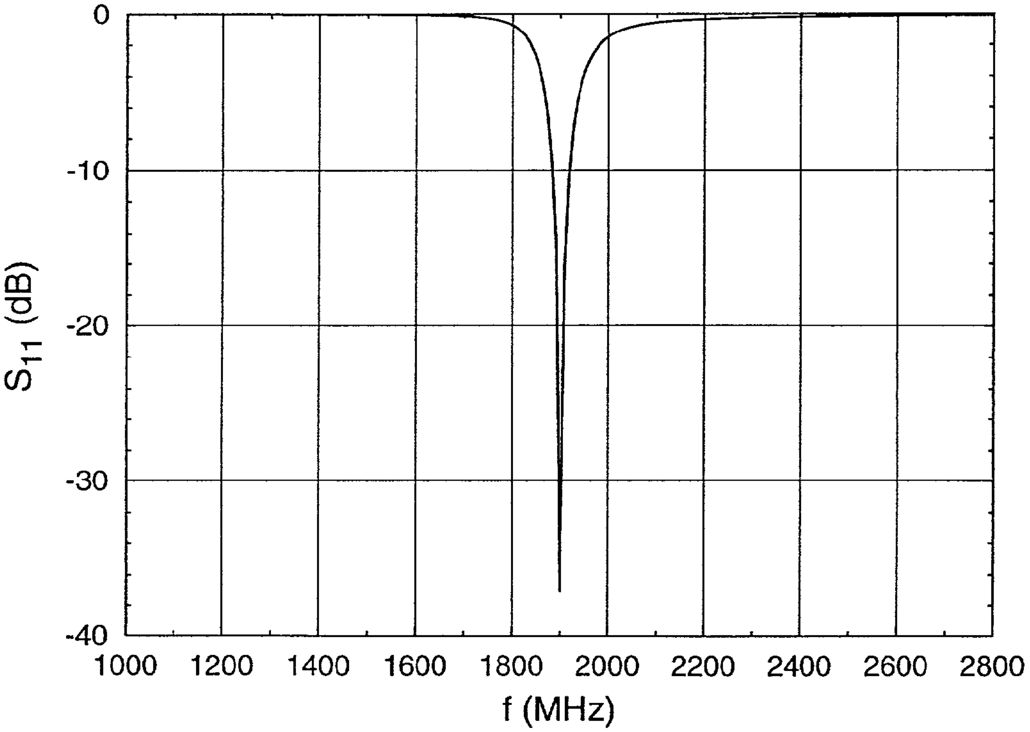
FIG. 6 is a graph of simulated return loss $S_{11}$ in dB against frequency f in MHz for the handset of FIG. 5.
Figure 7:
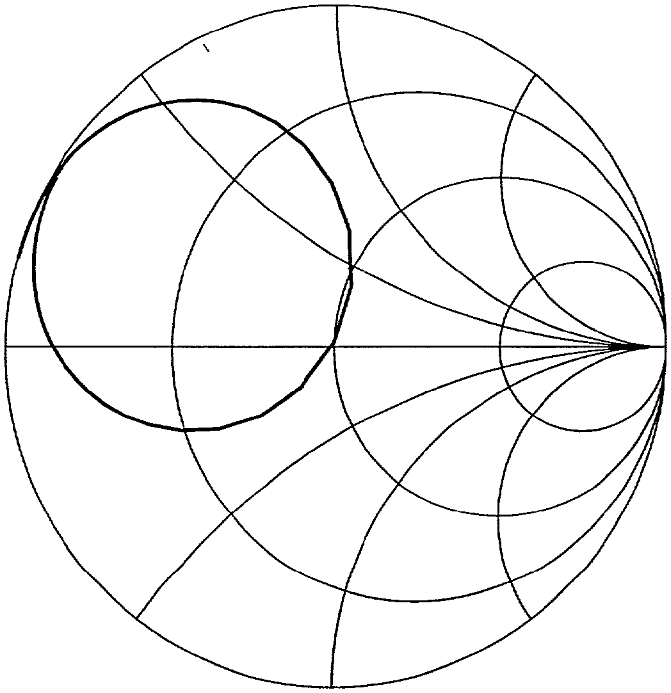
FIG. 7 is a Smith chart showing the simulated impedance of the handset of FIG. 5 over the frequency range 1000 to 2800 MHz.

The return loss $S_{11}$ of this embodiment after matching was simulated using the High Frequency Structure Simulator (HFSS), available from Ansoft Corporation, with the results shown in FIG. 6 for frequencies f between 1000 and 2800 MHz. A conventional two inductor "L" network was used to match at 1900 MHz. The resultant bandwidth at 7 dB return loss (corresponding to approximately 90% of input power radiated) is approximately 60 MHz, or 3%, which is useful but not as large as was required. A Smith chart illustrating the simulated impedance of this embodiment over the same frequency range is shown in FIG. 7.

Figure 8:
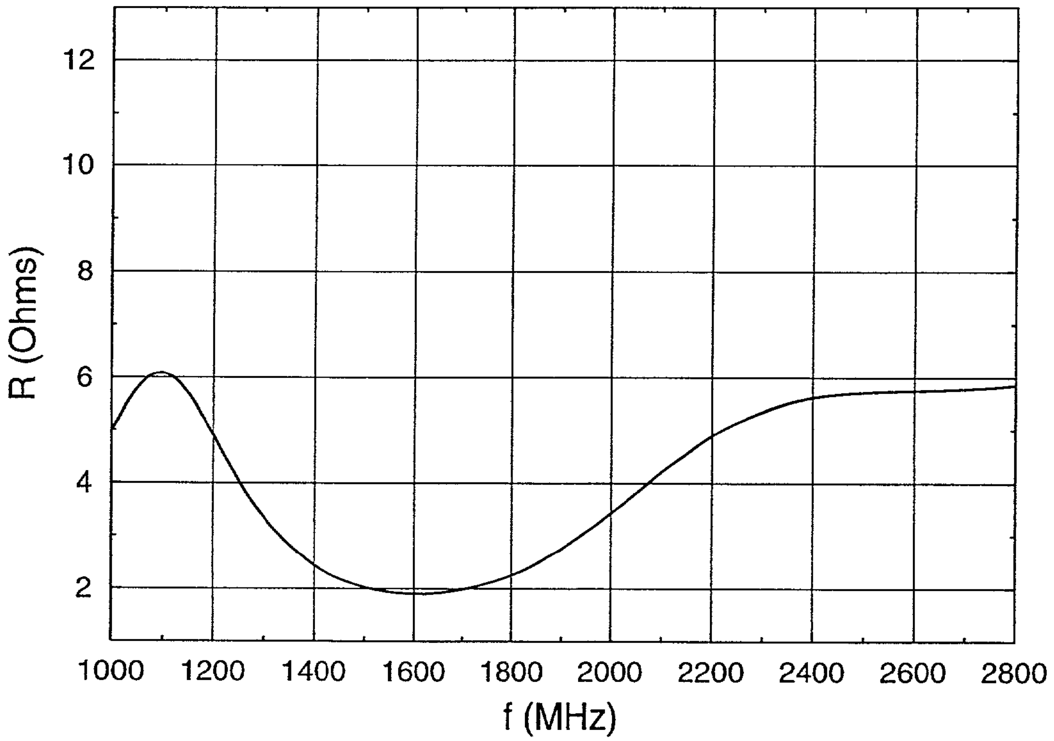
FIG. 8 is a graph showing the simulated resistance of the handset of FIG. 5.

The low bandwidth is because the combination of the handset 502 and capacitor 504 present an impedance of approximately 3−j90 Ω at 1900 MHz. FIG. 8 shows the resistance variation, over the same frequency range as before, simulated using HFSS. This can be improved by redesigning the case to increase the resistance, for example by the use of a slot or a narrower handset, as discussed in our co-pending unpublished International patent application PCT/EPO1/08550.

Figure 9:
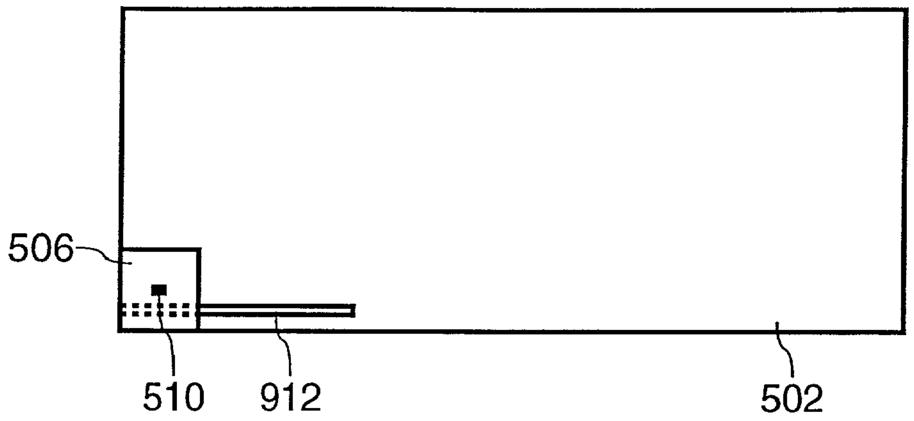
FIG. 9 is a plan view of a single-slotted self-resonant capacitively back-coupled handset.

The handset of FIG. 5 requires matching to obtain reasonable performance. There are significant advantages to being able to eliminate the need for matching. A plan view of a modified single band configuration which requires no matching is shown in FIG. 9. This embodiment differs from that of FIG. 5 in that the 10 mm square plate 506 is located 2 mm above the back of the handset 502, and in that a slot 912 of length 30 mm and width 1 mm is cut in the conducting material 2 mm from the edge of the handset case. The slot 912 extends under the conducting plate 506 (as shown by dashed lines in FIG. 9). The slot 912 is resonant at odd multiples of a quarter wavelength, i.e. at λ/4, 3 λ/4, etc.

The slot presents a high impedance to the coupling capacitor, thereby enabling a good match to 50 Ω. It is believed that the capacitor excites a transmission line mode in the slot 912 that acts as a shunt inductance at the antenna feed, which acts to match the response.

In the illustrated embodiment the slot 912 is located close to the edge of the handset case 502 in order to minimise the space used, although the slot could equally well be located on the other side of the coupling capacitor 504. Similarly, the coupling capacitor could be implemented in other positions on the handset 502 and the slot 912 could have a range of configurations, for example vertical, horizontal or meandering.

Figure 10:
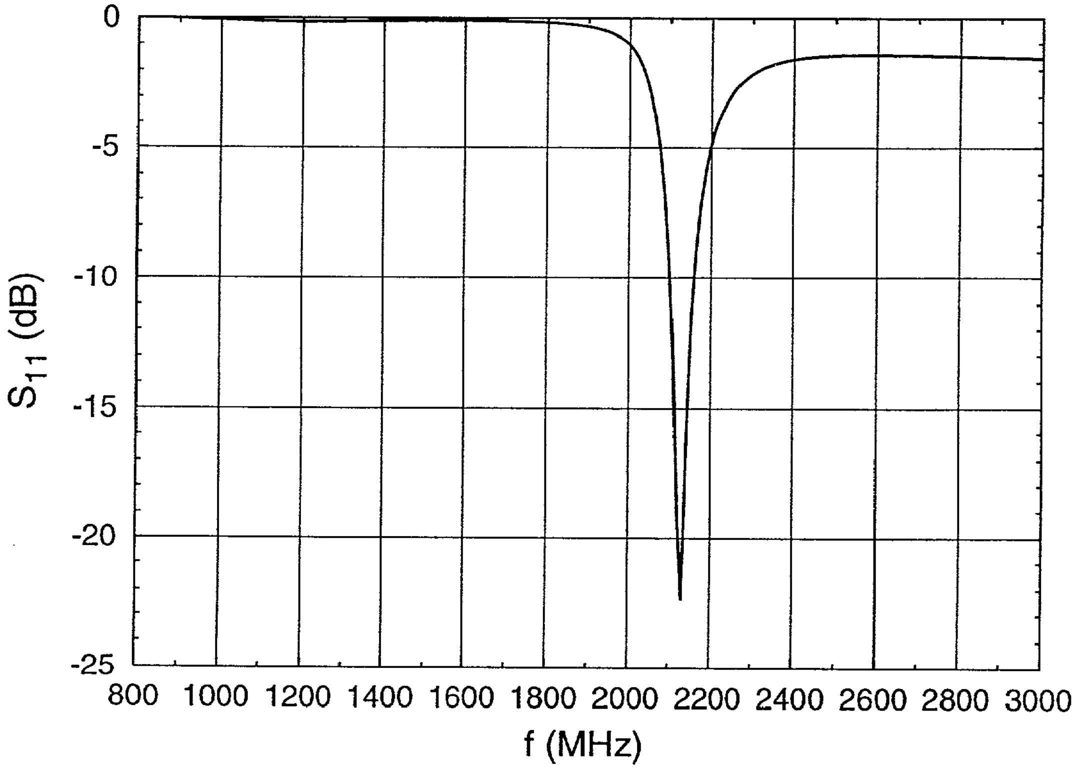
FIG. 10 is a graph of simulated return loss $S_{11}$ in dB against frequency f in MHz for the handset of FIG. 9.

The return loss $S_{11}$ of this embodiment, without matching, was simulated using HFSS, with the results shown in FIG. 10 for frequencies f between 800 and 3000 MHz. The resultant bandwidth at 7 dB return loss is approximately 90 MHz, or 4.3%. Although the bandwidth could be improved with matching, it is useful to be able to avoid having to include matching and the bandwidth is already more than sufficient for a Bluetooth embodiment, for example.

Figure 11:
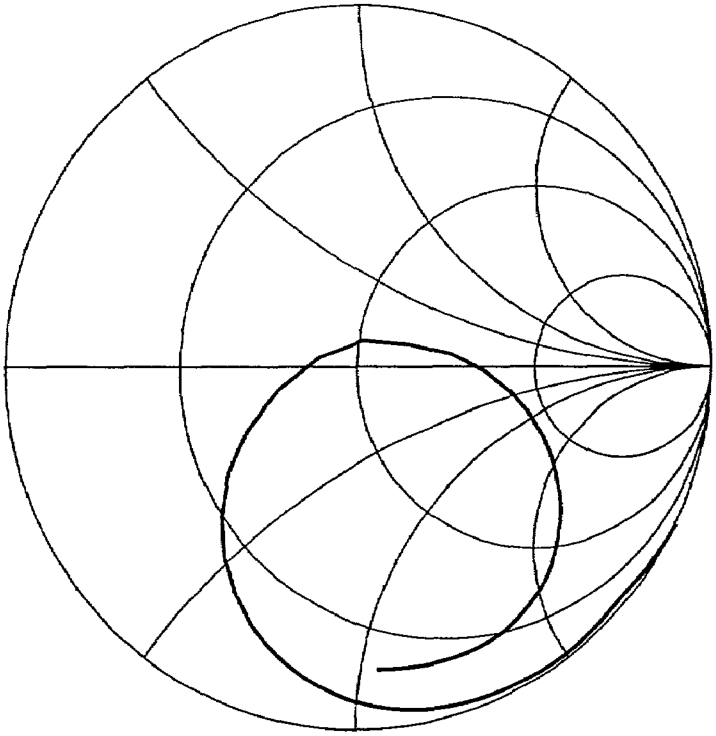
FIG. 11 is a Smith chart showing the simulated impedance of the handset of FIG. 9 over the frequency range 800 to 3000 MHz.

A Smith chart illustrating the simulated impedance of this embodiment over the same frequency range is shown in FIG. 11. This shows that the configuration of FIG. 9 also has the useful property that resonance (zero reactance) is achieved twice, with the higher frequency resonance having the higher resistance. This is particularly convenient, since the receive band is usually at a higher frequency in a frequency duplex system.

A preferred transceiver architecture is to maintain a low impedance path between the (generally low impedance) transmitter and the antenna, and a high impedance path between the antenna and the (generally high impedance) receiver. However, for simplicity of design it is conventional to use a 50 Ω system impedance with additional matching at the transmitter and receiver as required. This matching is lossy, and may also reduce the bandwidth seen at both the transmitter and receiver. Hence, the removal of the need for matching is a significant advantage of the present invention.

Figure 12:
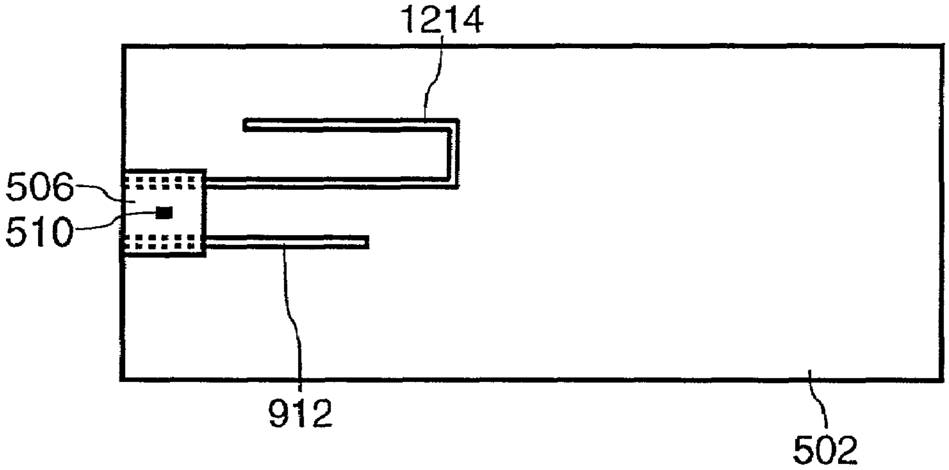
FIG. 12 is a plan view of a doubly-slotted self-resonant capacitively back-coupled handset.

A dual band embodiment of the present invention is shown in plan view in FIG. 12. In this embodiment the plate 506 and slot 912 have been moved to the top centre of the back surface of the handset 502, and a further slot 1214 has been added. The further slot 1214 is longer than the first slot 912, having a a total length of approximately 73 mm and a width of 1 mm, and folded to reduce the area it occupies.

Figure 13:
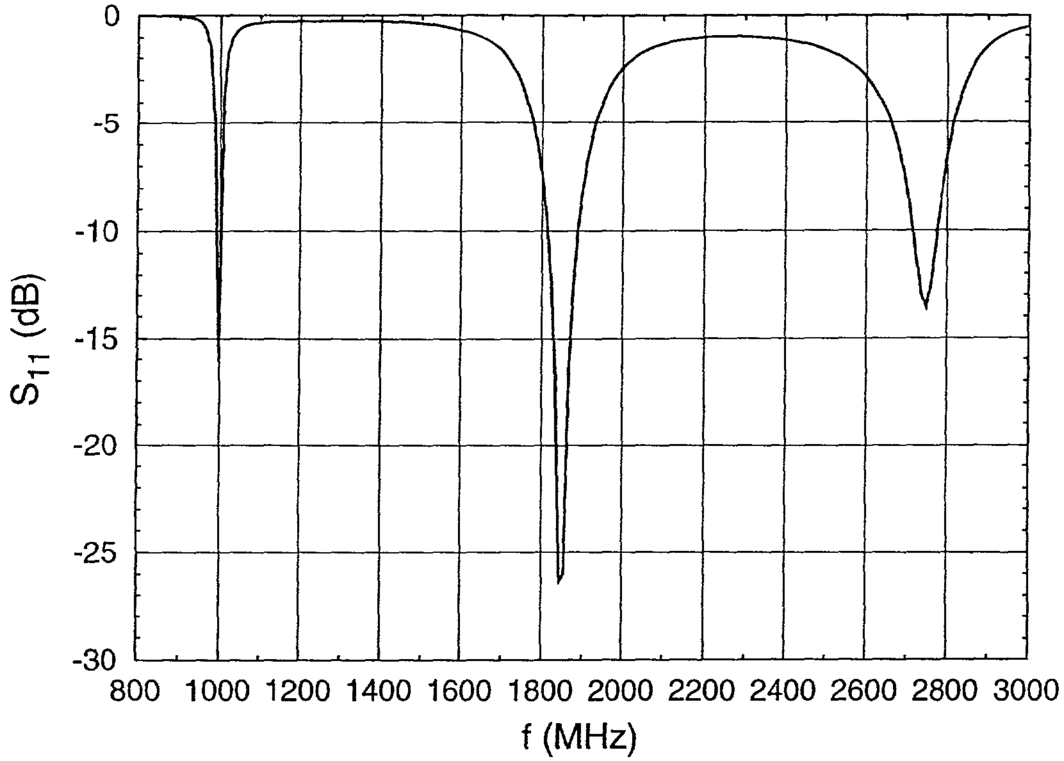
FIG. 13 is a graph of simulated return loss $S_{11}$ in dB against frequency f in MHz for the handset of FIG. 12.
Figure 14:
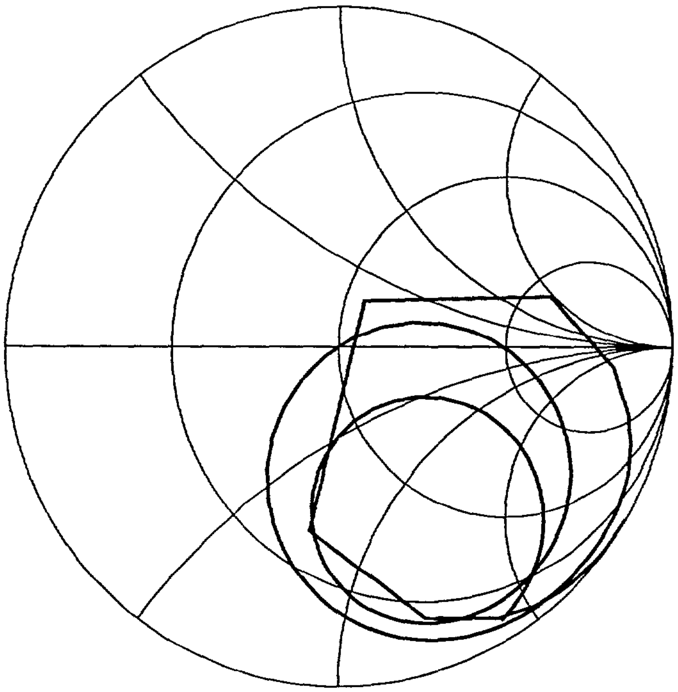
FIG. 14 is a Smith chart showing the simulated impedance of the handset of FIG. 12, over the frequency range 800 to 3000 MHz.

The return loss $S_{11}$ of this embodiment, without matching, was simulated using HFSS, with the results shown in FIG. 13 for frequencies f between 800 and 3000 MHz. It can clearly be seen that this design allows dual, tri or multiband operation. The slots 912, 1214 are resonant at odd multiples of λ/4, and can therefore be arranged to give individual or combined resonances.

The first resonance (at approximately 1 GHz) is the λ/4 resonance of the longer slot 1214. The second resonance (at approximately 1.8 GHz) is the λ/4 resonance of the shorter slot 912. The third resonance (at approximately 2.8 GHz) is the 3 λ/4 resonance of the longer slot 1214. It is clear, for example, that, with some modification, this configuration can be used for GSM, DCS1800 and Bluetooth.

The resultant bandwidths at 7 dB return loss for the three resonances are approximately 15 MHz (1.5%), 110 MHz (5.9%) and 110 MHz (3.9%). The bandwidth of the 1 GHz resonance is small, but the other bandwidths are good. A Smith chart illustrating the simulated impedance of this embodiment over the same frequency range is shown in FIG. 13. The rapid changes in impedance in the Smith chart reflect the narrow-band nature of the first resonance.

The self-resonance of each slot 912,1214 is independently variable via its position under the feeding capacitor 504: as the slot 912,1214 is progressively moved under the plate 506 the effect of its nominal shunt inductance increases. Also, each slot 912,1214 is high impedance at its open end and low impedance at its shorted end. Hence, the resistance could be varied by tapping off at various points along the slot. The capacitor can also be made asymmetric to allow for such tapping to be performed, to some extent.

Figure 15:
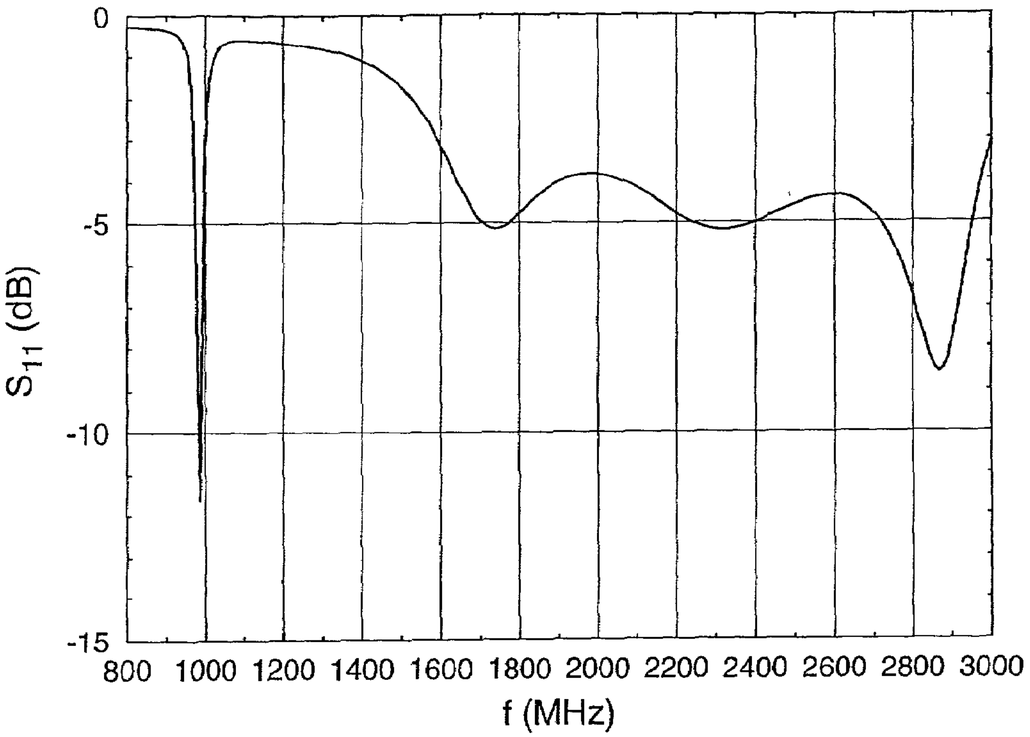
FIG. 15 is a graph of simulated return loss $S_{11}$ in dB against frequency f in MHz for the handset of FIG. 12 fed via a matching network.
Figure 16:
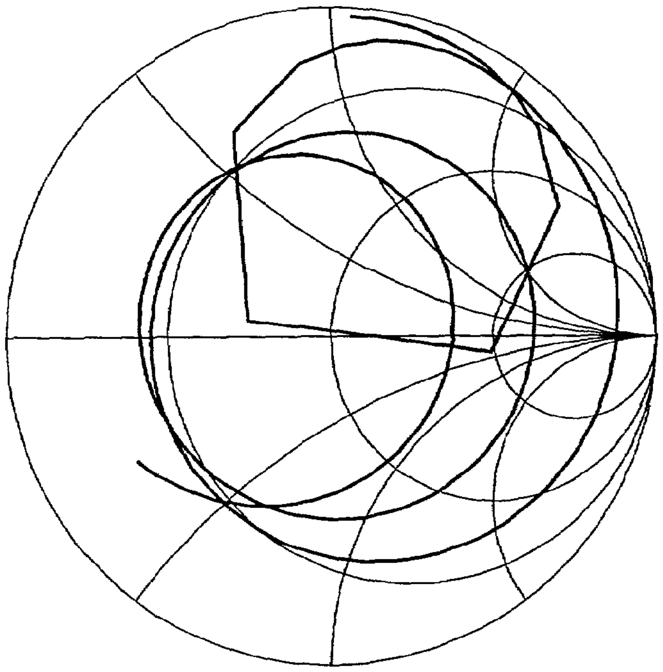
FIG. 16 is a Smith chart showing the simulated impedance of the handset of FIG. 12 fed via a matching network, over the frequency range 800 to 3000 MHz.

Embodiments of the present invention may also be used in conjunction with matching. As an example, simulations of the dual slot configuration illustrated in FIG. 12 in conjunction with a simple "L" matching circuit similar to that used for the basic embodiment of FIG. 5 were performed. Results for the return loss $S_{11}$ are shown in FIG. 15 for frequencies f between 800 and 3000 MHz. It can be seen that a very wide bandwidth is achieved (a 3 dB bandwidth of approximately 1.4 GHz). This could be enhanced further with a more elaborate matching circuit. A Smith chart illustrating the simulated impedance of this embodiment over the same frequency range is shown in FIG. 16.

In the above embodiments a conducting handset case has been the radiating element. However, other ground conductors in a wireless terminal could perform a similar function. Examples include conductors used for EMC shielding and an area of Printed Circuit Board (PCB) metallisation, for example a ground plane.

From reading the present disclosure, other modifications will be apparent to persons skilled in the art. Such modifications may involve other features which are already known in the design, manufacture and use of wireless terminals and component parts thereof, and which may be used instead of or in addition to features already described herein.

The invention claimed is:

1. A wireless terminal comprising a ground conductor and a transceiver coupled to an antenna feed, wherein the antenna feed is coupled directly to the ground conductor via a capacitor formed by a conducting plate separate from and opposed to a portion of the ground conductor and wherein a slot, partially located underneath the conducting plate, is provided in the ground conductor, wherein the ground conductor serves as a primary radiator, and wherein the capacitor is arranged in combination with the slot to facilitate a shunt inductance at the antenna feed.

2. A terminal as claimed in claim 1, wherein the slot is parallel to the major axis of the terminal.

3. A terminal as claimed in claim 1, wherein the slot is folded.

4. A terminal as claimed in claim 1, wherein a further slot, also partially located underneath the conducting plate, is provided in the ground conductor.

5. A terminal as claimed in claim 1, wherein the conducting plate is asymmetrical with respect to the major axis of the ground conductor.

6. A terminal as claimed in claim 1, wherein the ground conductor is a handset case.

7. A terminal as claimed in claim 1, wherein the ground conductor is a printed circuit board ground plane.

8. A terminal as claimed in claim 1, wherein a matching network is provided between the transceiver and the antenna feed.

9. A terminal as claimed in claim 1, wherein the capacitor excites a transmission line mode in the slot that acts as the shunt inductance at the antenna feed.

10. An antenna arrangement comprising:

a ground conductor having a slot therein;

a capacitor formed by a conducting plate separate from and opposed to a portion of the ground conductor;

an antenna feed coupled directly to the ground conductor via the capacitor;

wherein the slot is partially located underneath the conducting plate and arranged to shunt inductance at the antenna feed.

11. The arrangement of claim 10, wherein the ground conductor serves as a primary radiator for the arrangement.

12. The arrangement of claim 10, wherein the slot is resonant at odd multiples of a quarter wavelength.

13. The arrangement of claim 10, wherein the slot and the capacitor are arranged to facilitate the excitation of a transmission line mode in the slot.

14. The arrangement of claim 10, wherein the ground conductor has an additional slot therein.

15. The arrangement of claim 10, wherein the ground conductor has an additional slot therein, the additional slot being longer than said slot.

16. The arrangement of claim 10, wherein the ground conductor has an additional slot therein, the additional slot being longer than said slot and being folded.

17. The arrangement of claim 10, wherein the ground conductor has an additional slot therein, both of the slots are resonant at odd multiples of a quarter wavelength, and the slots are arranged to facilitate dual band, tri-band and multi-band frequency operation for a mobile handset.

18. A wireless telephone arrangement comprising:

a conducting handset case having a slot therein;

a capacitor formed by a conducting plate separate from and opposed to a portion of the case;

an antenna feed coupled directly to the case via the capacitor;

wherein the slot is partially located underneath the conducting plate and arranged to shunt inductance at the antenna feed.

19. The arrangement of claim 18, wherein the slot and the capacitor are arranged to facilitate the excitation of a transmission line mode in the slot.

20. The arrangement of claim 18, wherein the conducting handset includes a second slot partially located underneath the conducting plate, and the slots provide individual and combined resonances for operation of the wireless telephone arrangement under different frequency bands.

* * * * *